(12) United States Patent
Lev

(10) Patent No.: US 10,184,230 B2
(45) Date of Patent: Jan. 22, 2019

(54) MECHANICAL TOUCH FAUCET

(71) Applicant: Mordechai Lev, West Bloomfield, MI (US)

(72) Inventor: Mordechai Lev, West Bloomfield, MI (US)

(73) Assignee: SIDUS TECHNOLOGIES, INC., West Bloomfield, MI (US)

( * ) Notice: Subject to any disclaimer, the term of this patent is extended or adjusted under 35 U.S.C. 154(b) by 87 days.

(21) Appl. No.: 14/904,050

(22) PCT Filed: Jun. 9, 2014

(86) PCT No.: PCT/US2014/041576
§ 371 (c)(1),
(2) Date: Jan. 8, 2016

(87) PCT Pub. No.: WO2014/197903
PCT Pub. Date: Dec. 11, 2014

(65) Prior Publication Data
US 2016/0160481 A1 Jun. 9, 2016

Related U.S. Application Data

(60) Provisional application No. 61/832,782, filed on Jun. 8, 2013.

(51) Int. Cl.
*F16K 31/12* (2006.01)
*E03C 1/04* (2006.01)
(Continued)

(52) U.S. Cl.
CPC .......... *E03C 1/0404* (2013.01); *F16K 31/126* (2013.01); *F16K 31/1262* (2013.01);
(Continued)

(58) Field of Classification Search
CPC ............. Y10T 137/9464; F16K 19/006; F16K 31/602; F16K 31/126; F16K 31/1262;
(Continued)

(56) References Cited

U.S. PATENT DOCUMENTS

| 954,898 A | * | 4/1910 | Stenberg | ................. F16K 11/18 137/636 |
|---|---|---|---|---|
| 4,429,712 A | | 2/1984 | MacDonald | |

(Continued)

FOREIGN PATENT DOCUMENTS

WO 2009075858 A1 6/2009

*Primary Examiner* — Matthew W Jellett
(74) *Attorney, Agent, or Firm* — Avery N. Goldstein; Blue Filament Law PLLC

(57) ABSTRACT

An inventive touch faucet device for coupling to a pressurized fluid supply is provided that includes a faucet with a depressible touch surface segment and an outlet, where a mechanical touch mechanism is actuated by the touch surface, and induces a fluid flow from the pressurized fluid supply through the outlet in response to a user depression of the touch surface segment. The touch faucet device may further include a mixing valve for control of fluid temperature and flow rate. The mechanical touch mechanism in embodiments of the inventive touch faucet device includes an activation knob in an activator mechanism that is actuated by pressure applied by the touch surface, and a hydraulic valve in mechanical communication with the activator mechanism, the activator mechanism controlling the hydraulic valve.

12 Claims, 17 Drawing Sheets

(51) Int. Cl.
*F16K 31/126* (2006.01)
*F16K 31/54* (2006.01)

(52) U.S. Cl.
CPC .............. *F16K 31/54* (2013.01); *F16K 31/12* (2013.01); *Y10T 137/9464* (2015.04)

(58) Field of Classification Search
CPC .. F16K 31/1266; F16K 31/128; E03C 1/0404; E03C 1/0412
USPC ................................... 251/236, 25; 137/801
See application file for complete search history.

(56) References Cited

U.S. PATENT DOCUMENTS

| | | | | |
|---|---|---|---|---|
| 4,725,038 A | * | 2/1988 | Heneker | F16K 31/385 |
| | | | | 137/801 |
| 4,907,744 A | * | 3/1990 | Jousson | A61C 17/0202 |
| | | | | 137/625.44 |
| 4,997,004 A | * | 3/1991 | Barkhimer | F02M 47/027 |
| | | | | 137/596.17 |
| 6,006,784 A | * | 12/1999 | Tsutsui | E03C 1/0403 |
| | | | | 137/359 |
| 6,738,996 B1 | * | 5/2004 | Malek | B05B 1/1618 |
| | | | | 239/441 |
| 6,742,542 B1 | * | 6/2004 | Dierks | F15B 11/006 |
| | | | | 137/596 |
| 6,962,168 B2 | | 11/2005 | McDaniel et al. | |
| 7,070,125 B2 | * | 7/2006 | Williams | B05B 1/1618 |
| | | | | 239/443 |
| 7,150,293 B2 | | 12/2006 | Jont | |
| 7,232,111 B2 | | 6/2007 | McDaniel et al. | |
| 7,997,301 B2 | | 8/2011 | Marty et al. | |
| 8,127,782 B2 | | 3/2012 | Jonte et al. | |
| 8,243,040 B2 | | 8/2012 | Koottungal | |
| 8,365,767 B2 | | 2/2013 | Davidson et al. | |
| 8,424,569 B2 | | 4/2013 | Marty et al. | |
| 2004/0088786 A1 | | 5/2004 | Malek et al. | |
| 2004/0227014 A1 | | 11/2004 | Williams et al. | |
| 2005/0150556 A1 | | 7/2005 | Jonte | |
| 2005/0150557 A1 | | 7/2005 | McDaniel et al. | |
| 2005/0199841 A1 | | 9/2005 | O'Maley et al. | |
| 2006/0101575 A1 | | 5/2006 | Louis | |
| 2009/0019636 A1 | | 1/2009 | Kajuch et al. | |
| 2009/0133763 A1 | | 5/2009 | Yang | |
| 2009/0272445 A1 | | 11/2009 | Shimizu et al. | |
| 2009/0320949 A1 | | 12/2009 | Liao | |
| 2010/0170570 A1 | | 7/2010 | Rodenbeck et al. | |
| 2010/0269923 A1 | | 10/2010 | Parsons | |
| 2011/0088799 A1 | | 4/2011 | Jung | |
| 2011/0308641 A1 | | 12/2011 | Hu et al. | |
| 2012/0227849 A1 | | 9/2012 | Rodenbeck et al. | |
| 2012/0266983 A1 | | 10/2012 | Tsai et al. | |
| 2012/0273075 A1 | * | 11/2012 | Pitsch | F16K 3/04 |
| | | | | 137/801 |
| 2012/0318364 A1 | | 12/2012 | Sawaski et al. | |
| 2012/0318386 A1 | | 12/2012 | Guzman | |
| 2013/0081713 A1 | | 4/2013 | Hsu | |
| 2013/0100033 A1 | | 4/2013 | Yuan et al. | |

\* cited by examiner

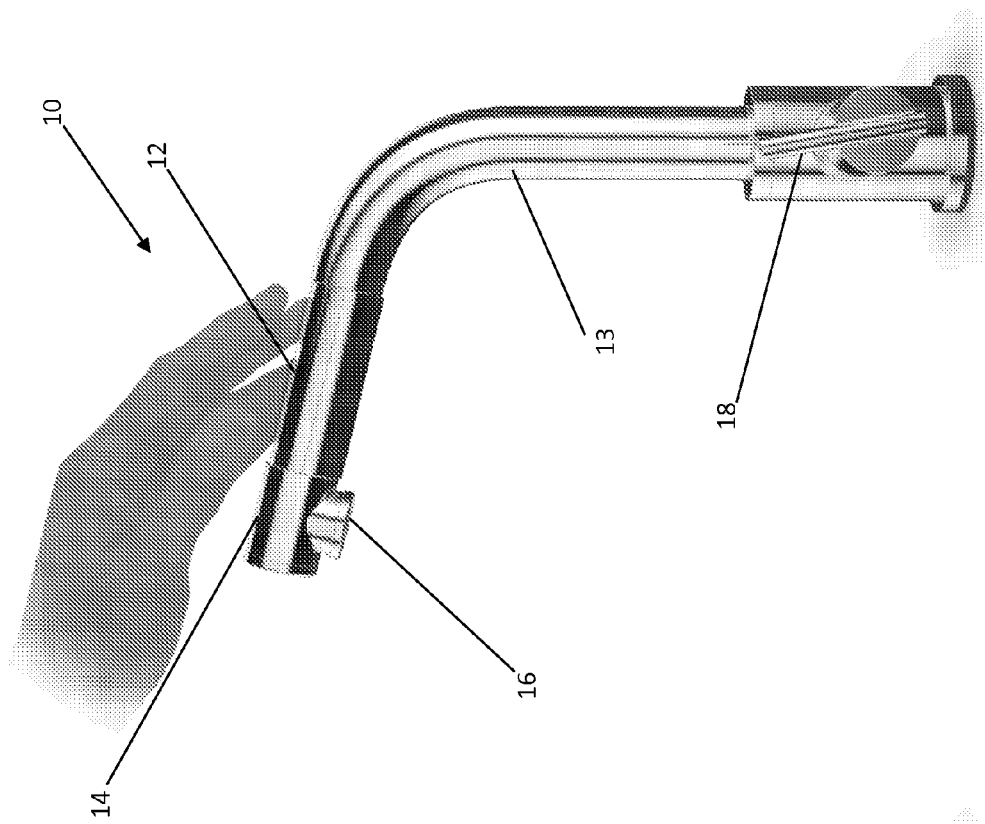
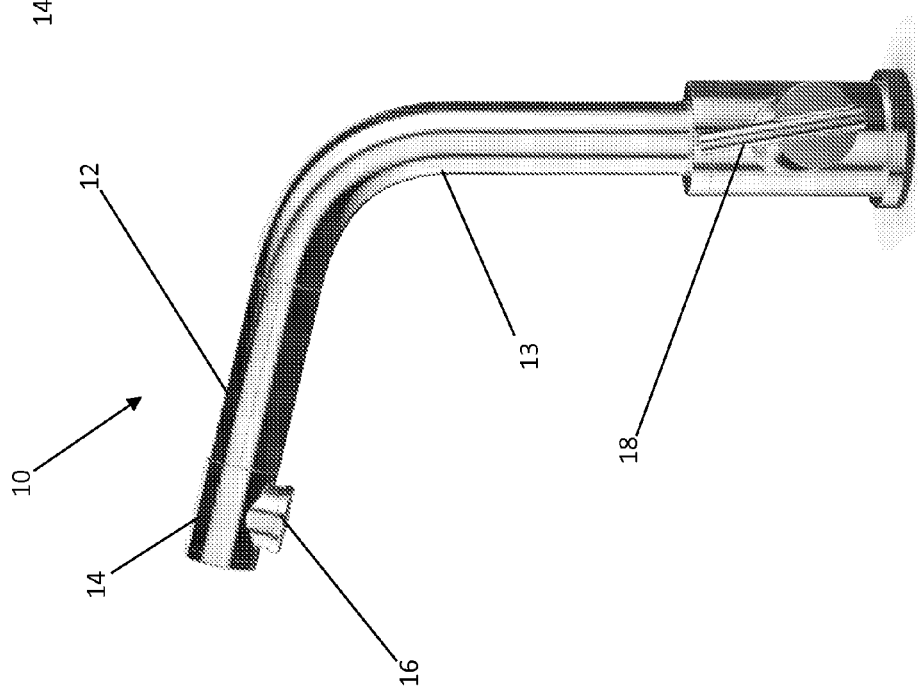
FIG. 1A
FIG. 1B

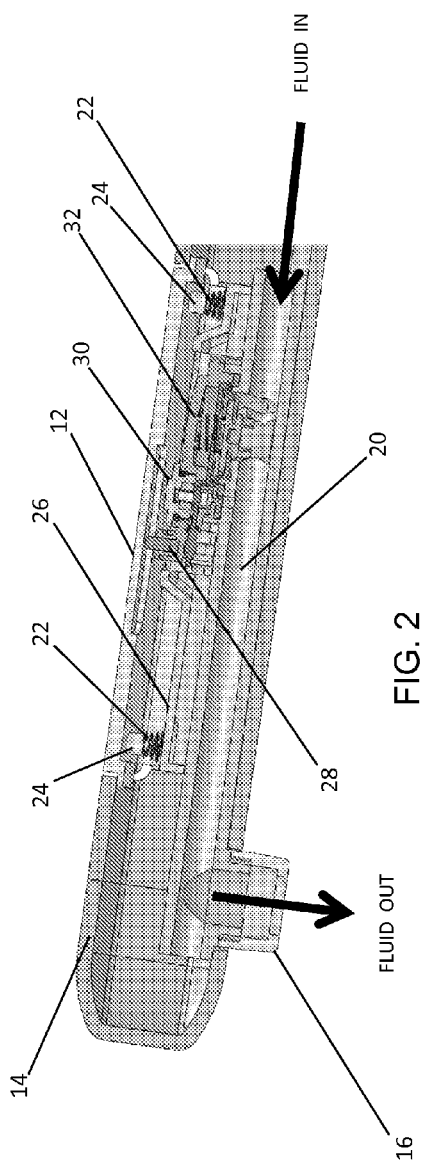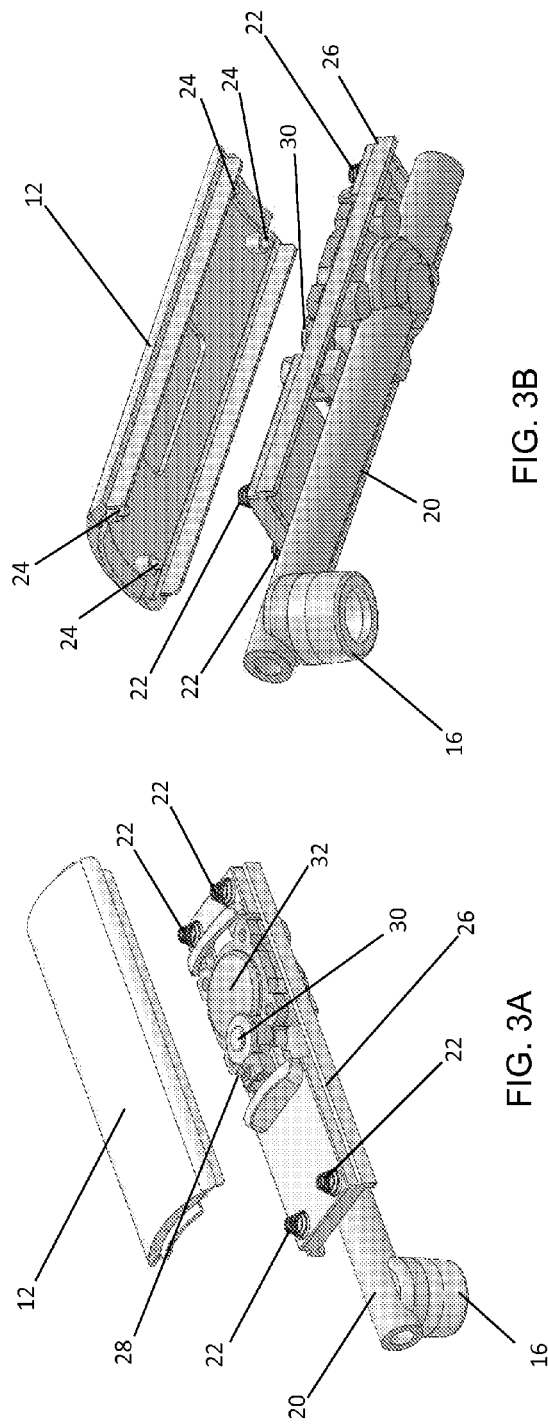

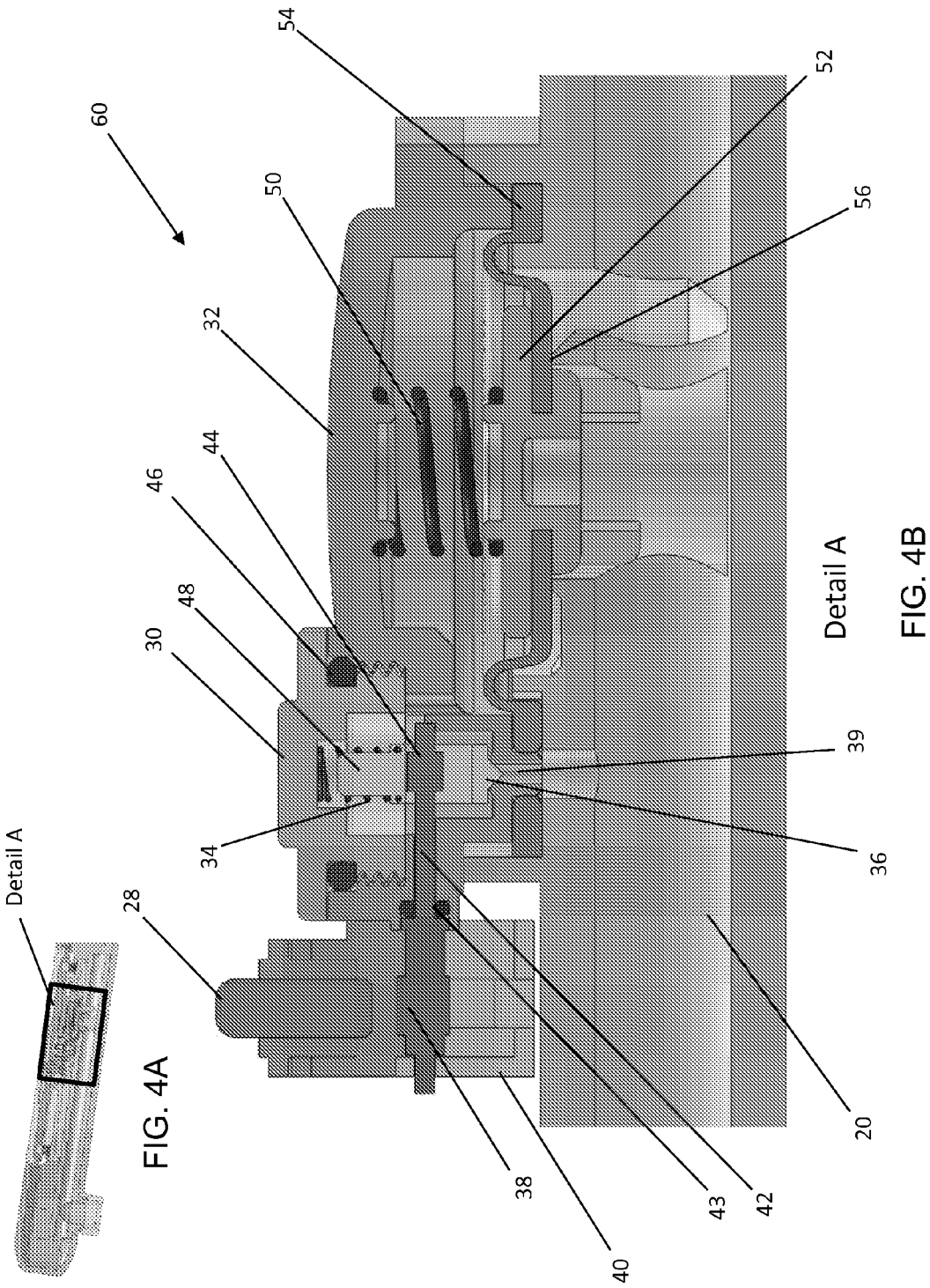

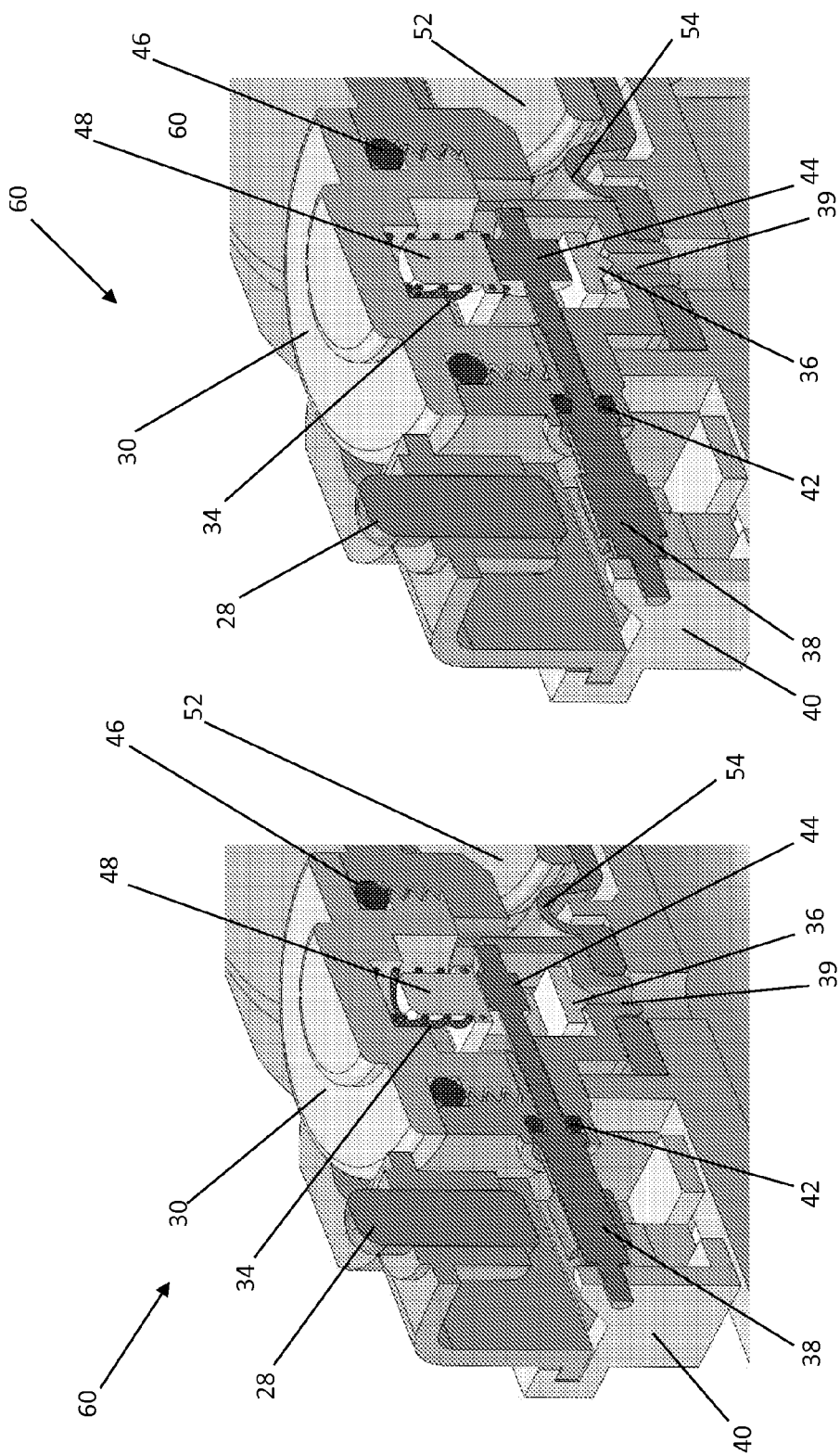

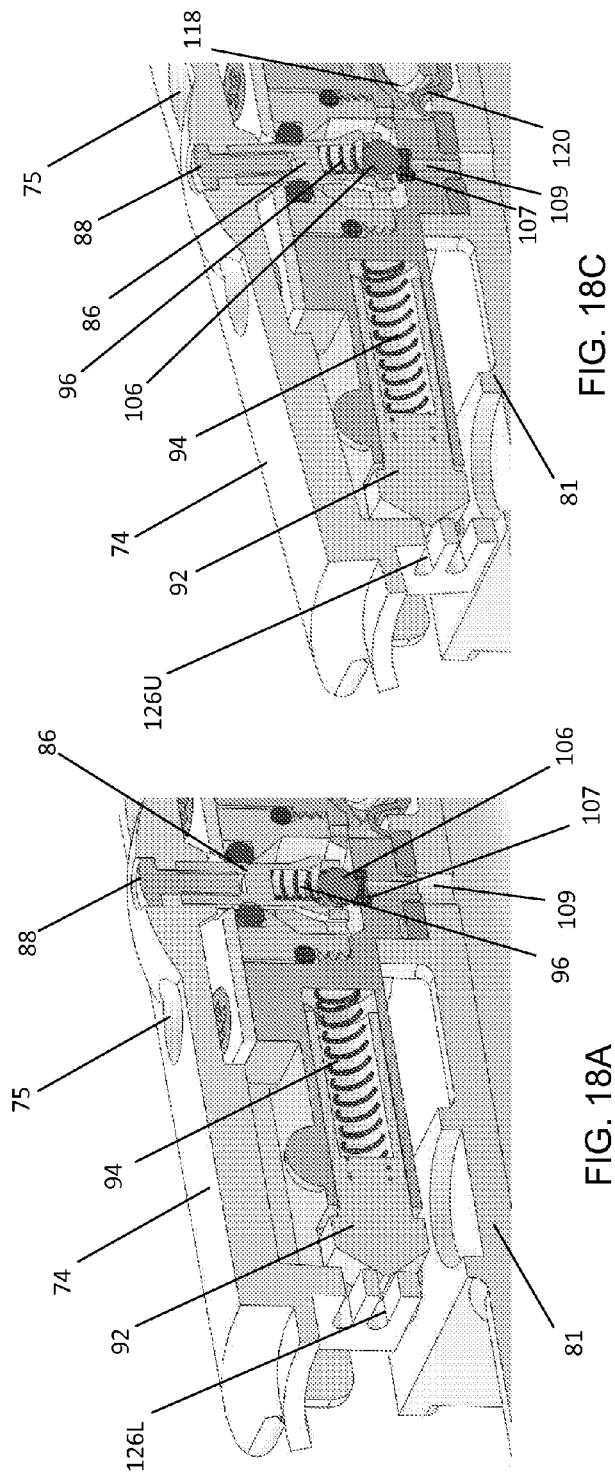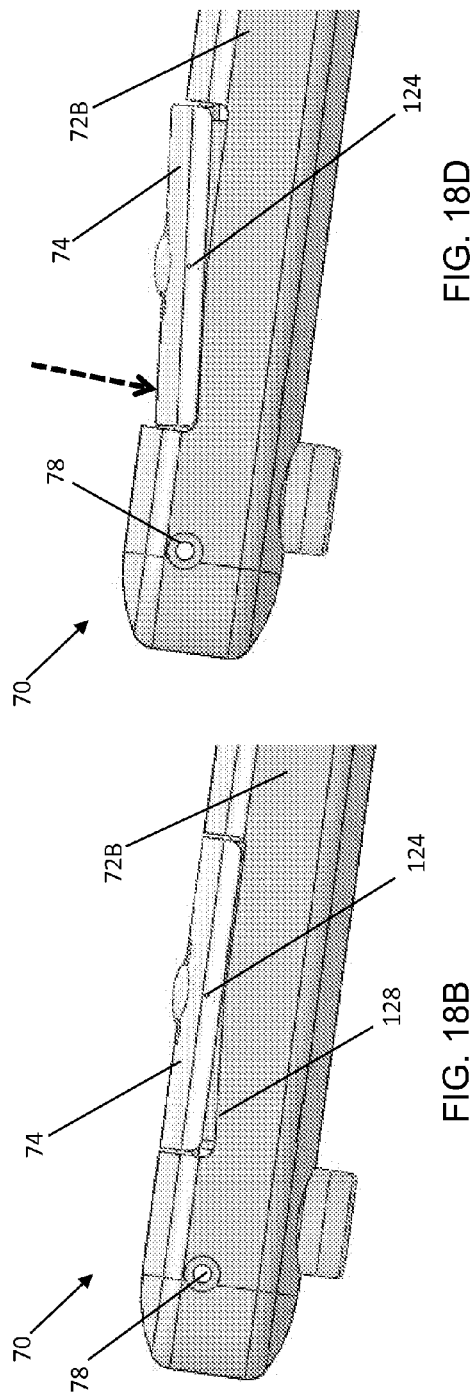
FIG. 18A
FIG. 18B
FIG. 18C
FIG. 18D

MECHANICAL TOUCH FAUCET

RELATED APPLICATIONS

This application claims priority benefit of U.S. Provisional Application Ser. No. 61/832,782 filed Jun. 8, 2013; the contents of which are hereby incorporated by reference.

FIELD OF THE INVENTION

The present invention in general relates to fluid flow control devices and in particular, to a mechanical touch faucet.

BACKGROUND OF THE INVENTION

Currently, touch faucets available on the market are electrically driven. Typically, the design of a touch faucet includes a hydraulic valve controlled by a solenoid that is controlled by electronic circuitry sensitive to human touch to the faucet spout based on living tissue resistive or capacitive characteristics. The conventional touch faucet electronic circuitry provides commands to the system to either open the water flow or close the water flow with a pressurized water supply, while the temperature and flow of the electronic touch faucet remain controlled by a traditional mixing valve or set of valves.

However, electronic touch faucets require an electrical power source such as batteries, or line power. The requisite power requirement and required electronics complicate the installation of the conventional touch faucet, and decrease the reliability of operation. Additionally, permit approvals are required for both plumbing and electrical inspectors. Furthermore, a loss of electrical power may interrupt the supply of water and in the case of battery power; period replacement represents an additional source of maintenance.

Thus, there exists a need for a mechanical touch faucet that provides the same operational benefits and features of an electronic faucet, but is driven by a mechanical assembly thus simplifying the system, eliminating the use of an electrical power supply, eliminating the need for electronic control circuitry, and simplifying installation while increasing long term operational reliability.

SUMMARY OF THE INVENTION

An inventive touch faucet device for coupling to a pressurized fluid supply is provided that includes a faucet with a depressible touch surface segment and an outlet, where a mechanical touch mechanism is actuated by the touch surface, and induces a fluid flow from the pressurized fluid supply through the outlet in response to a user depression of the touch surface segment. The touch faucet device may further include a mixing valve for control of fluid temperature and flow rate.

The mechanical touch mechanism in embodiments of the inventive touch faucet device includes an activation knob in an activator mechanism that is actuated by pressure applied by the touch surface, and a hydraulic valve in mechanical communication with the activator mechanism, the activator mechanism controlling the hydraulic valve. The activator mechanism further includes a cam shaft having a proximal end to the activation knob with a set of gear teeth and a distal end with a cam that controls the upward or downward motion of a needle valve for opening or closing a fluid orifice. The activation knob further includes a flexing actuating arm in mechanical communication with the gear teeth that advances the cam in ninety degree increments for every user touch of the touch surface segment.

A touch faucet device for coupling to a pressurized fluid supply includes a faucet with a rocker switch touch plate and an outlet; and a mechanical valve actuated by the rocker switch touch plate, the mechanical valve inducing fluid flow from the pressurized fluid supply through the outlet in response to a user depression of the rocker switch.

BRIEF DESCRIPTION OF THE DRAWINGS

The present invention is further detailed with respect to the following drawings that are intended to show certain aspects of the present invention, but should not be construed as a limit on the practice of the present invention.

FIGS. 1A and 1B illustrate an inventive mechanical touch faucet in an off state and in the act of being touch depressed to activate the same, respectively;

FIG. 2 is a cross-sectioned view showing the spout portion of the faucet assembly of FIGS. 1A and 1B with the mechanical touch mechanism according to an embodiment of the invention; and FIGS. 3A and 3B are upper and lower exploded perspective views of the touch mechanism and inner water tube according to a specific embodiment of the invention;

FIGS. 4A and 4B are cross-sectioned detailed views of the touch mechanism and inner water tube of FIG. 2 according to a specific embodiment of the invention;

FIGS. 6A and 6B are cross-sectioned detail views of the cam and hydraulic valve interface in the closed and open position, respectively according to a specific embodiment of the invention;

FIGS. 18A and 18B show a cross-sectioned view of a closed valve notching mechanism with the non-depressed rocker switch, respectively; and FIGS. 18C and 18D show a cross-sectioned view of an open valve notching mechanism with the depressed rocker switch, respectively.

DESCRIPTION OF THE INVENTION

Figure 5B:
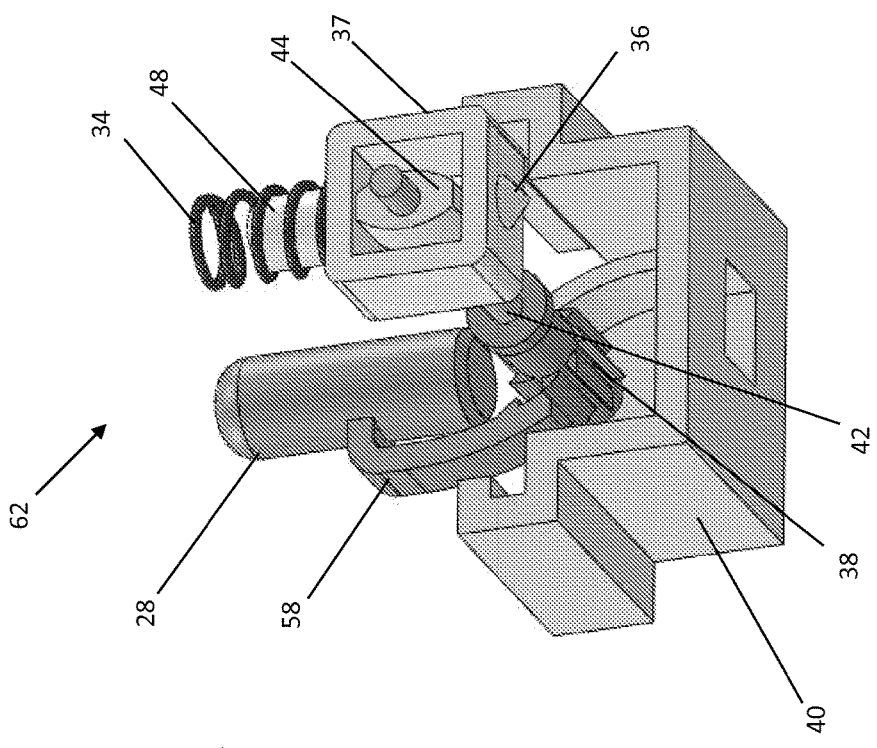
FIGS. 5A and 5B are cross-sectioned detailed views of the activation knob, cam gear, and cam with the valve in a closed and open position, respectively according to a specific embodiment of the invention.

The present invention has utility as mechanical touch faucet. An inventive faucet affords the operational benefits and features as an electronic faucet without the necessity of resort to an electrical power supply, eliminating the need for electronic control circuitry, and simplifying installation while increasing long term operational reliability.

An inventive faucet is activated by a linear depressing motion that contrasts with the rotary motion associated with rotating a valve stem.

Unless noted to the contrary, components of an inventive faucet are formed of materials conventional to the art of plumbing fixture manufacture and in recognition that material compatibility is required for a given fluid flowing therethrough.

While the present invention is detailed herein with respect to the mechanically controlled flow of water, it is appreciated that an inventive faucet is suitable for delivery of aqueous solutions that illustratively include carbonated beverages, alcoholic drinks, medicaments, and juices; organic liquids; and other compositions flowable at temperatures compatible with the inventive faucet construction. As used herein, the term "water" should be treated as being synonymous with a generic liquid fluid.

Referring now to FIGS. 1A and 1B, an embodiment of the inventive mechanical touch faucet is shown generally at 10, and characterized by having a neck region 13, a spout 14, and fluid outlet 16 with a large touch surface segment 12. It is appreciated that the neck region 13 need not have a bend relative to the downstream portion as determined relative to a pressurized water supply (not shown) that is in fluid communication with the faucet 10. The touch surface segment 12 while depicted as intermediate between the neck region 13 and the spout 14 is appreciated to be amenable to be positioned anywhere on the faucet 10 to which a user has touch access. The faucet 10 may have an outer surface that is made of chrome plated materials, stainless steel, metals, plastics, composite materials, and combinations thereof; and in contrast to the conventional touch faucet need not be electrically conductive. In operation, a user depresses the touch surface segment 12 through a pre-defined travel distance to open the water or fluid flow and once again to close the water or fluid flow. In the embodiment depicted, each single touch of the surface segment 12 that initiates the pre-selected travel either opens or closes the water flow from the pressurized fluid supply. It is appreciated that a stepped touch surface can allow partial opening of the water flow with each successive user touch; by way of example, a first touch induces a partially open water flow, a second touch initiates complete opening of the water flow, and a third touch terminates the water flow.

The water temperature and flow rate in this embodiment are controlled by a traditional mixing valve 18. It is appreciated that in other embodiments of the inventive touch faucet may lack a mixing valve 18, and may simply dispense water at a single rate and single temperature.

FIG. 2 is a cross-sectioned view showing the spout portion 14 of the faucet assembly of FIGS. 1A and 1B with the mechanical touch mechanism 26 according to embodiments of the invention. Water flows through an inner water tube 20 and out of outlet 16 is controlled by the touch mechanism 26. The bottom of the touch surface segment 12 rests on four touch springs 22 via pins 24 that insert into hollows of the springs 22, and is in contact with the activation knob 28. Every touch (depression) of the touch surface 12 actuates the activation knob 28, by placing downward pressure on the activation knob 28. A hydraulic valve sub assembly 60 (as shown and numbered in FIG. 4B) is enclosed under needle valve cover 30 and diaphragm chamber cover 32. The operation and components of the touch mechanism 26 will be described in greater detail below with like numerals used between various figures intended to have like meaning.

FIGS. 3A and 3B are upper and lower exploded perspective views of the touch mechanism 26 and inner water tube 20 according to embodiments of the invention. Also visible is the hydraulic valve sub assembly 60 (as shown and numbered in FIG. 4B), which is enclosed under needle valve cover 30. A sealing gasket 46 creates a fluid tight barrier to preclude water from breaching the containment so created. The diaphragm chamber cover 32 includes a hydraulic valve 52 with a diaphragm 54 that either allows water to go downstream through the inner water tube 20 to the outlet 16 or shuts off the water flow from the pressurized fluid source.

The inventive hydraulic valve sub assembly 60, unlike those presently found in hydraulic valves used in irrigation and garden irrigation systems, is controlled mechanically and does not use a solenoid to actuate the valve. Through the user touch induced depression a translation of a portion of the assembly 60 results in a preselected travel of the assembly 60, and water flow is modified through the assembly 60. In certain inventive embodiments, an activator mechanism 62, as shown in greater detail in FIGS. 5A and 5B, replaces the need for a solenoid. One depression of the activating knob 28 moves the mechanically coupled needle valve 36 upward thereby opening the orifice 39 allowing the diaphragm 54 to move up and release water downstream from the pressurized fluid supply. A second depression of the activating knob 28 forces the needle valve 36 downward thereby closing the orifice 39, at which point the water pressure along with the diaphragm spring 50 forces the diaphragm 54 to close against the inner tube 20 at point 56 and shut off the water flow from the pressurized fluid supply. The activating knob 28 has a flexing actuating arm 58 in mechanical engagement or contact with gear teeth 38 attached to a proximal end of cam shaft 42. The flexing actuating arm 58 advances the gear teeth 38 one gear tooth at a time when the activating knob is depressed. The cam shaft 42 is sealed by an O-ring 43. At the distal end of cam shaft 42, a cam 44, which is centered on the cam shaft 42 and has an oblong or rectangular shape, rotates in ninety degree increments in response to a user depressing the activating knob 28. The cam 44 is positioned in a rectangular aperture 37 portion of the needle valve 36, and as a result with every press on the activation knob 28 that is engaged with the cam shaft 42 rotates the cam shaft 42 by one tooth, turning the cam ninety degrees from the closed position to open position.

Figure 5A:
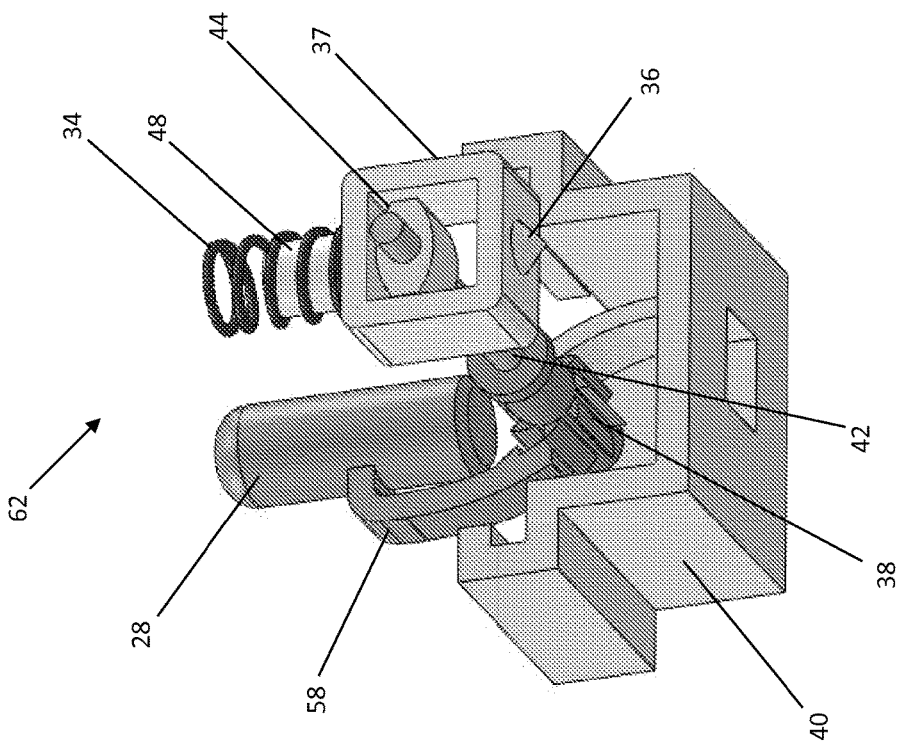

In FIG. 5A, the cam 44 is in a horizontal or flat position with respect to the rectangular aperture 37, and with a bias return spring 34 mounted on pin extension 48 pushing downward on the needle valve 36, the return spring 34 forces the needle valve 36 against the orifice 39, shutting off the water flow in the inner water tube 20. In FIG. 5B, the cam 44 is in the upright (shown vertical) position, lifting the needle valve 36 against the downward bias of the return spring 34. The lift of the needle valve 36 opens the orifice 39, which allows water to flow through the spout to the outlet. In operation, the activator 62 is a mechanism similar to a "pen" mechanism in which one press opens the pen and the next closes the pen, only in this case instead of moving the pen the activator 62 moves the needle valve 36. It is appreciated that intermediate positions on the cam 44 between those depicted in FIGS. 5A and 5B afford partially open positions associated with a low flow of water from the pressurized fluid supply.

FIGS. 6A and 6B are cross-sectioned detail views of the cam 44 within the hydraulic valve sub assembly 60 in the closed and open position as described in FIGS. 5A and 5B, respectively according to embodiments of the invention. In FIG. 6A with the cam 44 in the horizontal position, the needle valve 36 is forced against the orifice 39 and shuts off the water flow. In FIG. 6B with the cam 44 in the vertical (up) position, the needle valve 36 is lifted so as to oppose the force of return spring 34 and lift the needle valve 36 away from the orifice 39 and opening a channel through the orifice 39 for the water to flow.

Figure 7:
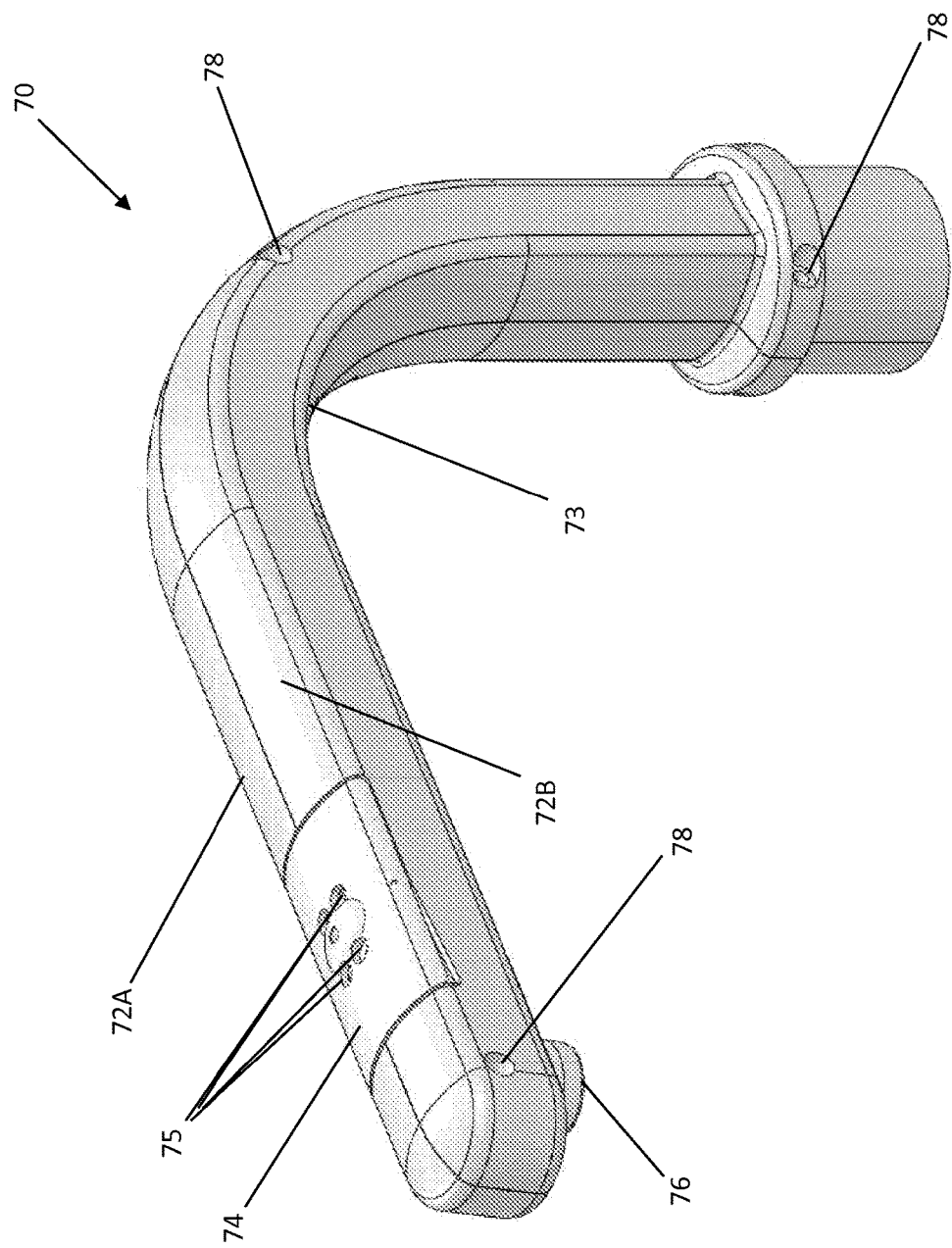
FIG. 7 illustrates an inventive mechanical touch faucet with a rocker valve switch to control the flow of fluids.
Figure 8:
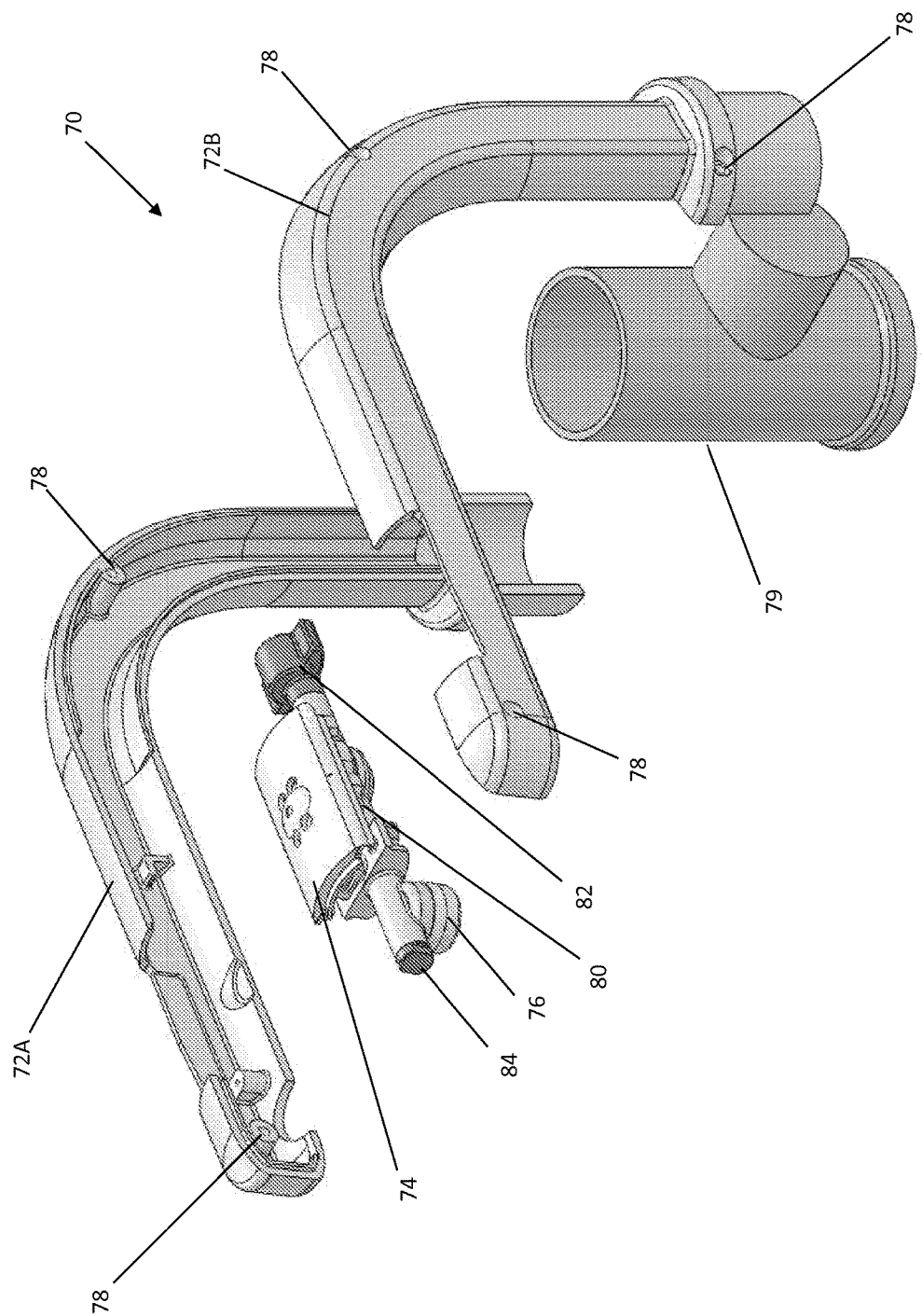
FIG. 8 is an exploded view of the touch faucet of FIG. 7 showing the rocker valve switch and valve mechanism according to an embodiment of the invention.

FIG. 7 illustrates an inventive mechanical touch faucet 70 with a rocker switch touch plate 74 to control the flow of fluids to an aerator 76. The body of the faucet 70 may be assembled with two half shells 72A and 72B that are joined by fasteners at locations 78 as shown in FIG. 8. The body may be formed from metal, plastic, or composite materials. In a specific embodiment the fasteners may be M-4 bolts and nuts. The four holes 75 in the rocker switch touch plate 74 provide improved handling access. It is appreciated that the neck region 73 need not have a bend relative to the downstream portion as determined relative to a pressurized water supply (not shown) that is in fluid communication with the faucet 70. The touch rocker surface segment 74 and the valve mechanism hydraulics assembly 80 while depicted as intermediate between the neck region 73 and the spout 14 is appreciated to be amenable to be positioned anywhere on the faucet 70 to which a user has touch access. The faucet 70 may have an outer surface that is made of chrome plated materials, stainless steel, metals, plastics, composite materials, and combinations thereof. In operation, a user depresses the touch surface segment 74 through a predefined travel distance to open the water or fluid flow and once again to close the water or fluid flow. In an embodiment, each single touch of the rocker surface segment 74 initiates a pre-selected travel that either opens or closes the water flow from the pressurized fluid supply. It is appreciated that a stepped touch surface can allow partial opening of the water flow with each successive user touch; by way of example, a first touch induces a partially open water flow, a second touch initiates complete opening of the water flow, and a third touch terminates the water flow. The body of the faucet 70 is mountable to a spout base 79 that may have additional controls and a mixer valve (not shown) for adjusting the dispensed fluid temperature.

Figure 9:
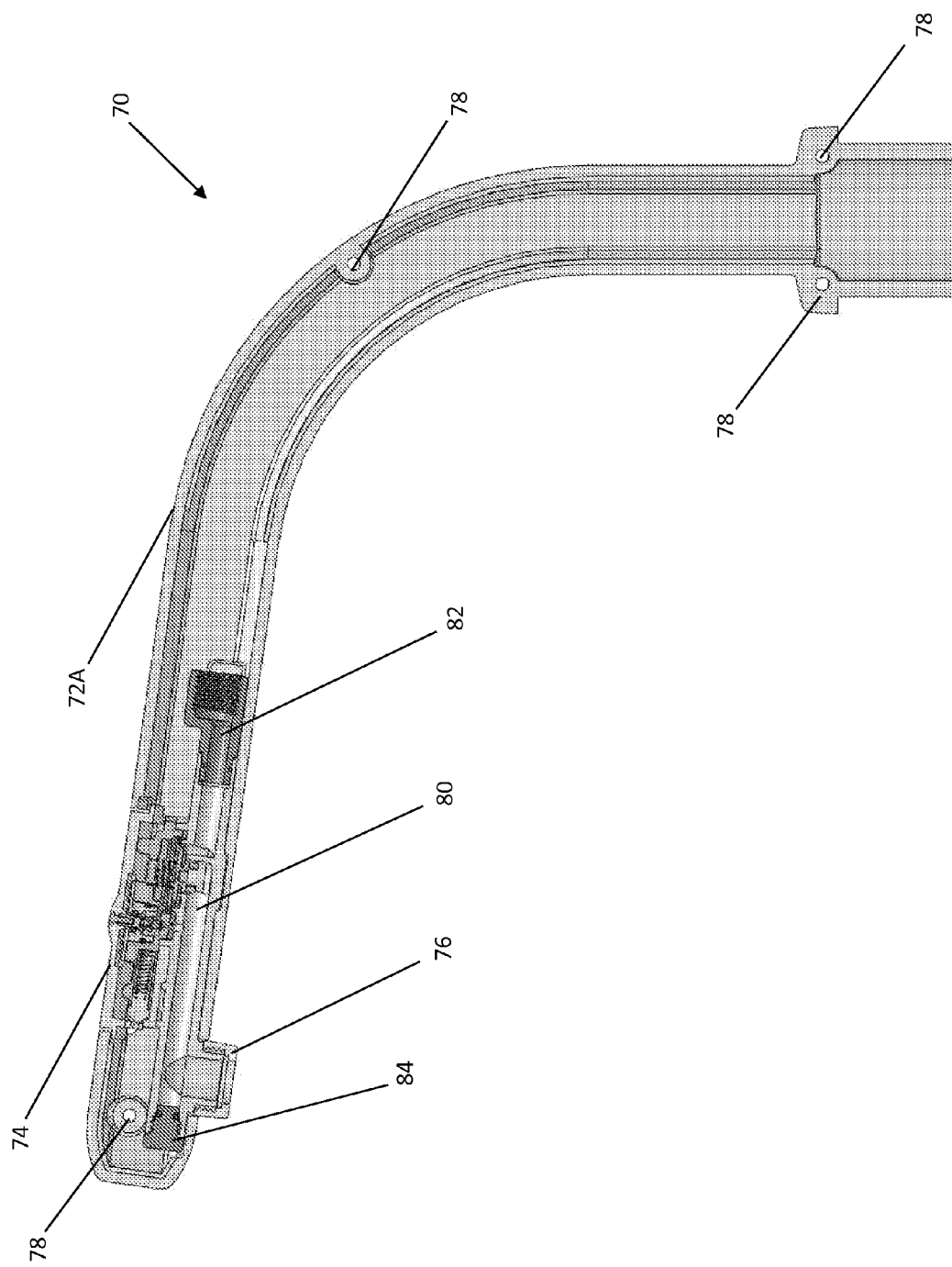
FIG. 9 is a cross-sectioned view of the touch faucet of FIG. 7 showing the rocker valve switch and valve mechanism according to an embodiment of the invention.
Figure 10:
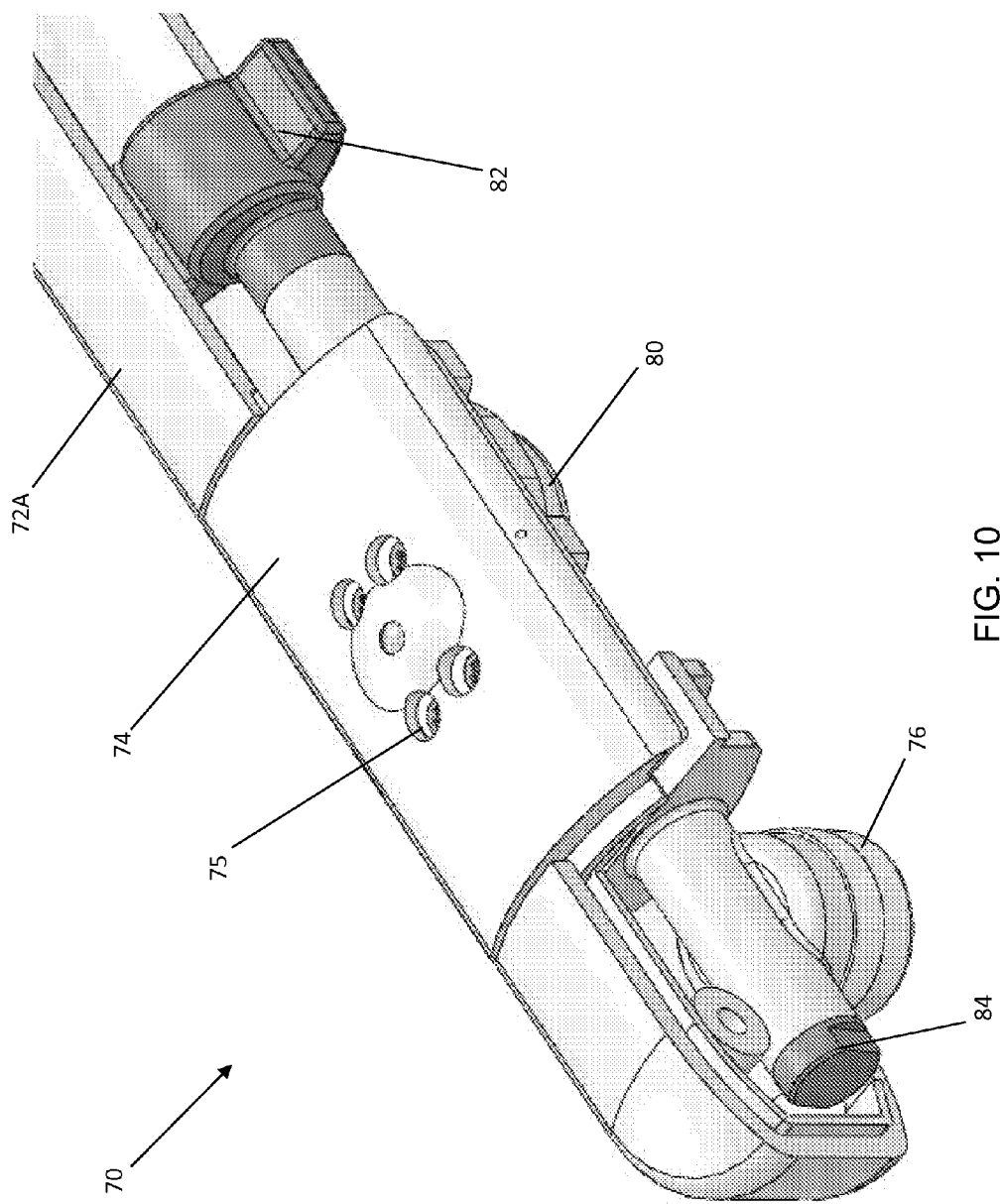
FIG. 10 is a partial perspective view of the spout portion of the touch faucet of FIG. 7 showing the rocker valve switch over the valve mechanism according to an embodiment of the invention.

FIG. 9 is a cross-sectioned view of the touch faucet 70 of FIG. 7 showing the rocker valve switch touch surface 74 and valve mechanism 80. FIG. 10 is a partial perspective view of the spout portion of the touch faucet 70 of FIG. 7 showing the rocker switch touch surface 74 over the valve mechanism 80.

Figure 11:
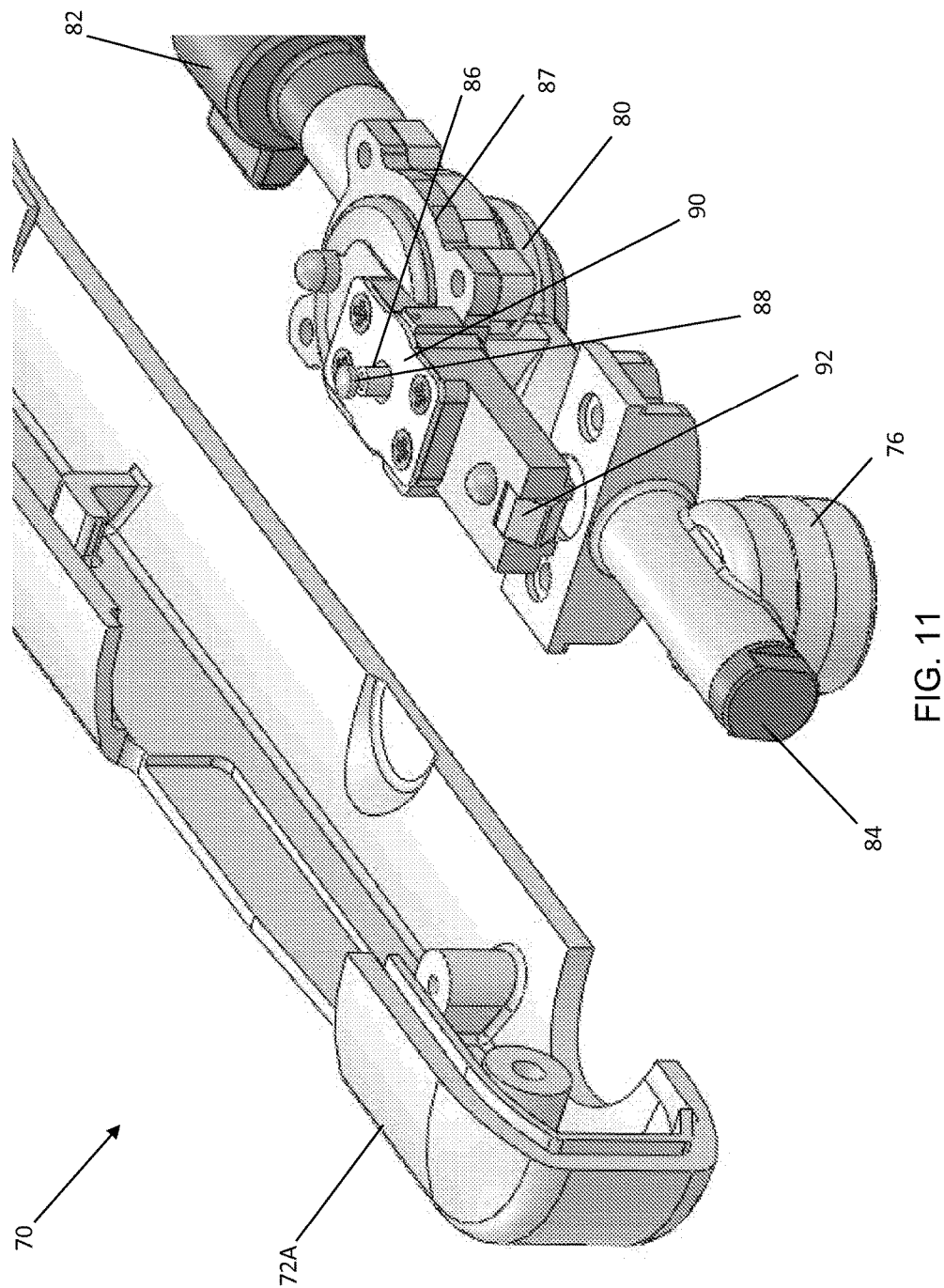
FIG. 11 is a partial perspective view of the spout portion of the touch faucet of FIG. 7 showing with the rocker valve switch removed to fully show the valve mechanism according to an embodiment of the invention.
Figure 12:
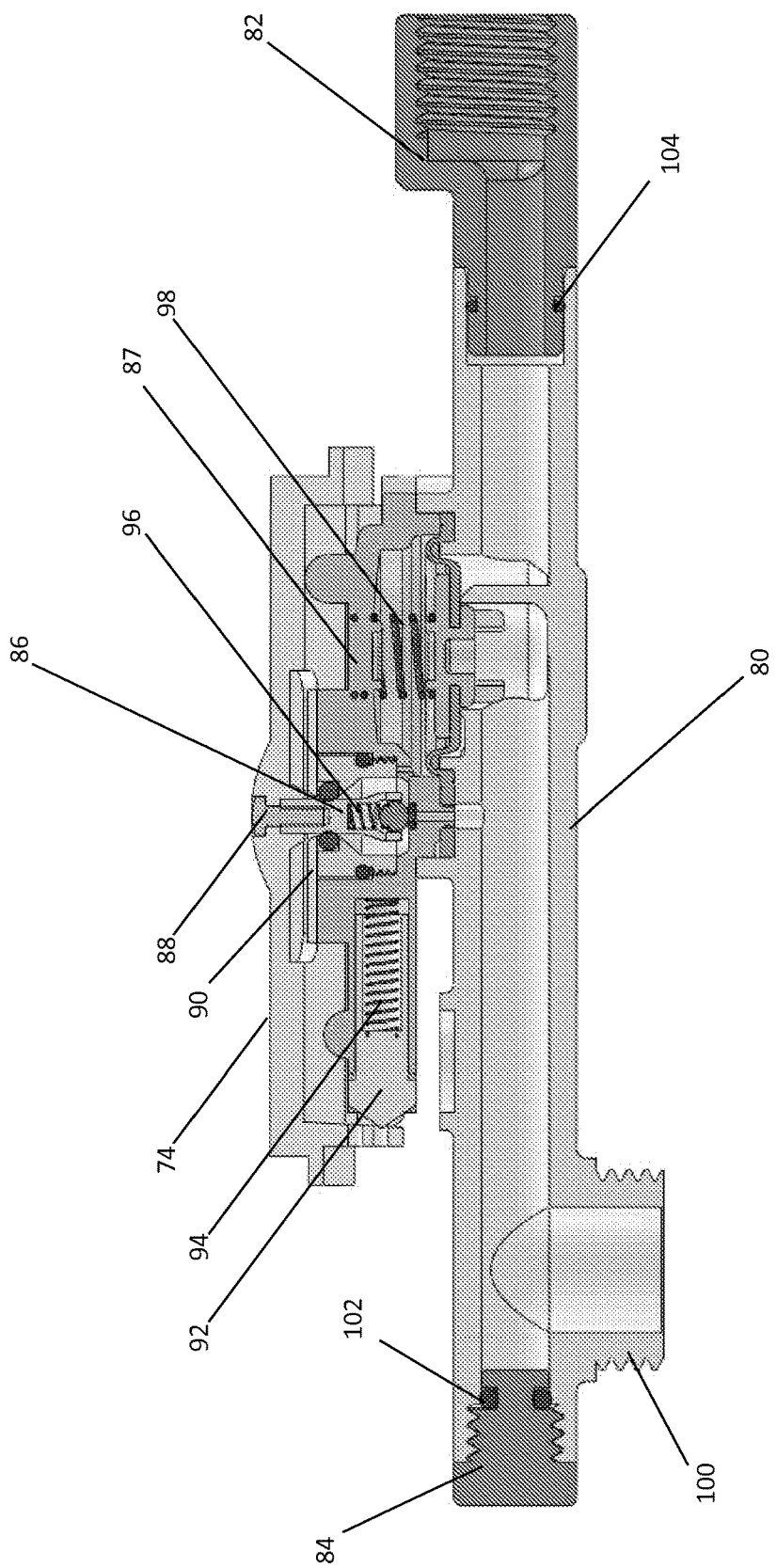
FIG. 12 is a cross-sectioned view of the rocker valve switch and the valve mechanism according to an embodiment of the invention.
Figure 13:
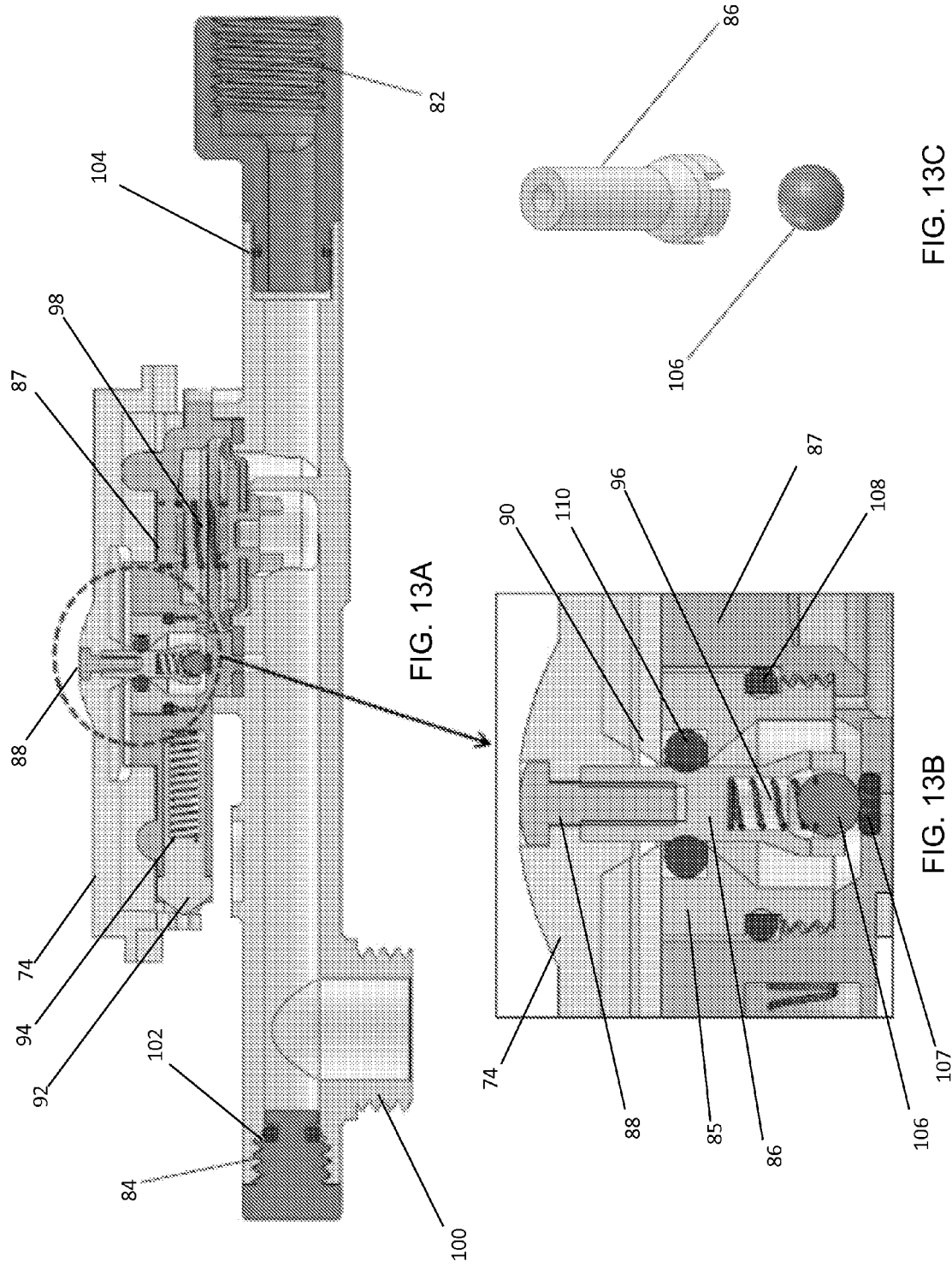
FIGS. 13A-13C are detailed cross-sectional views of the rocker valve switch, valve mechanism, and associated components according to an embodiment of the invention.
Figure 14:
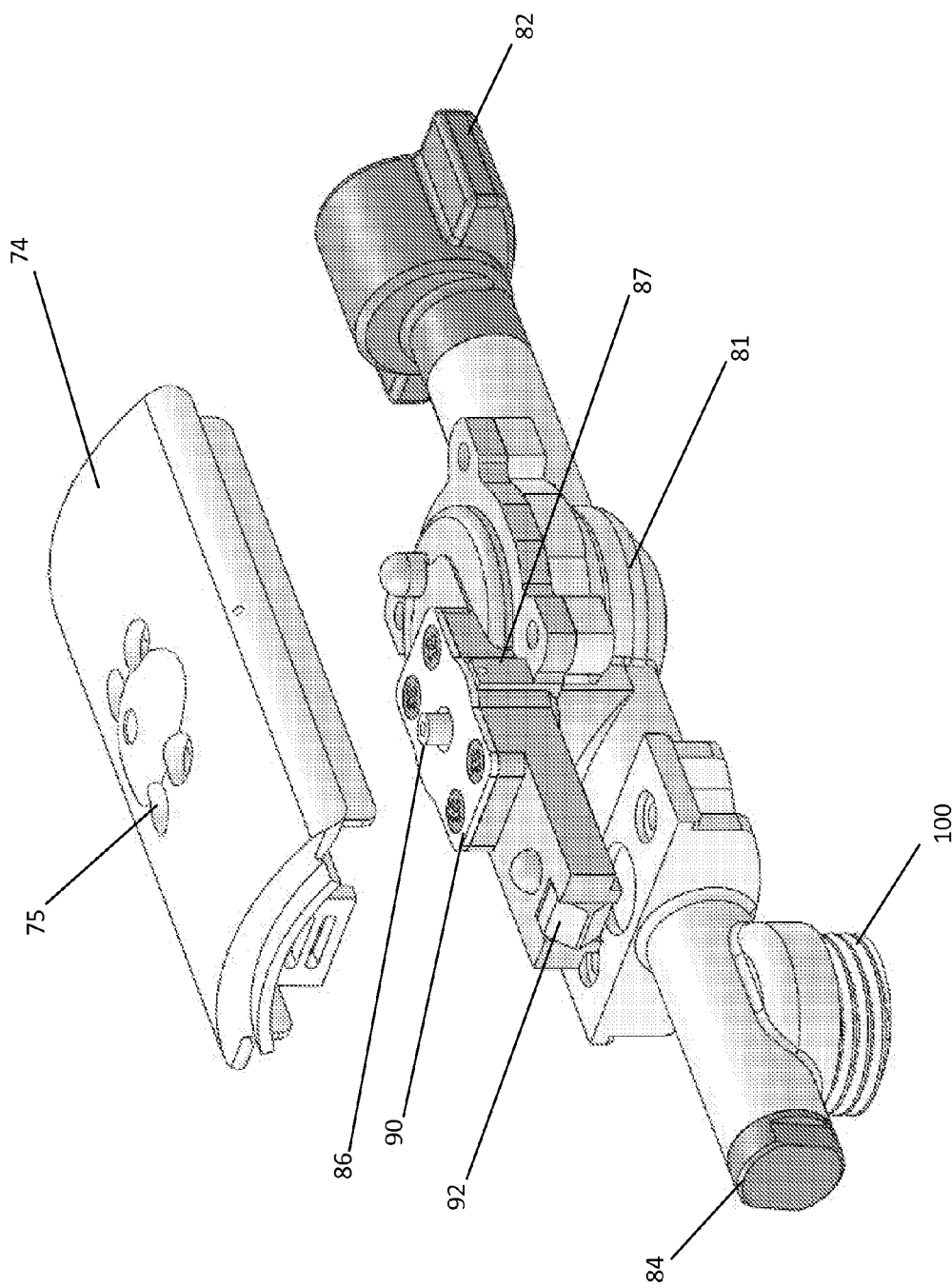
FIG. 14 is a perspective view of the rocker valve switch separated from the valve mechanism according to an embodiment of the invention.

FIG. 11 is a partial perspective view of the spout portion of the touch faucet 70 of FIG. 7 showing with the rocker valve switch touch surface 74 removed to fully expose the underlying valve mechanism 80 according to a specific embodiment of the invention. FIG. 12 is a cross-sectioned view of the rocker valve switch mechanism 83 and the valve mechanism 80. FIGS. 13A-13C are detailed cross-sectional views of the rocker valve switch mechanism 83, valve mechanism 80, and associated components. FIG. 14 is a perspective view of the rocker valve switch touch surface 74 separated from the valve mechanism hydraulic assembly 80.

As shown in FIG. 12 and FIGS. 13A-13C, the valve mechanism 80 has a ball cage 86 that retains a spring 96 that rest on a ball 106 that allows for a pivoting action of the rocker switch touch surface 74 that is attached to the top portion of the ball cage 86, which may be brass. In a specific embodiment, the top of the ball cage has a threaded bore that accommodates a fastener 88 that secures the rocker switch touch surface 74 to the ball cage 86. In a specific embodiment the fastener is a M-2 screw, the ball is a 3 mm stainless steel sphere. The rocker valve switch mechanism 83 and the valve mechanism 80 have a series of O-rings that act as fluid sealers. In the specific non-limiting embodiment shown the O-rings with their corresponding dimensions are as follows: O-ring 102 (wire 2.0 mm×5.5 mm diameter) for plug 84, O-ring 108 (wire 1.5 mm×11.5 mm diameter) for the ball cage cap 85, O-ring 110 (wire 2.0 mm×5.0 mm diameter) for the ball cage 86, O-ring 107 (wire 1.0 mm×2.0 mm diameter) for the ball 106 to rest on, and O-ring 104 (wire 1.2 mm×9.0 diameter) for the adaptor 82. The adaptor 82 has an internal bored thread for coupling to a water supply hose (not shown). The valve mechanism 80 has a threaded spout 100 for the attachment of the aerator 76.

Figure 15:
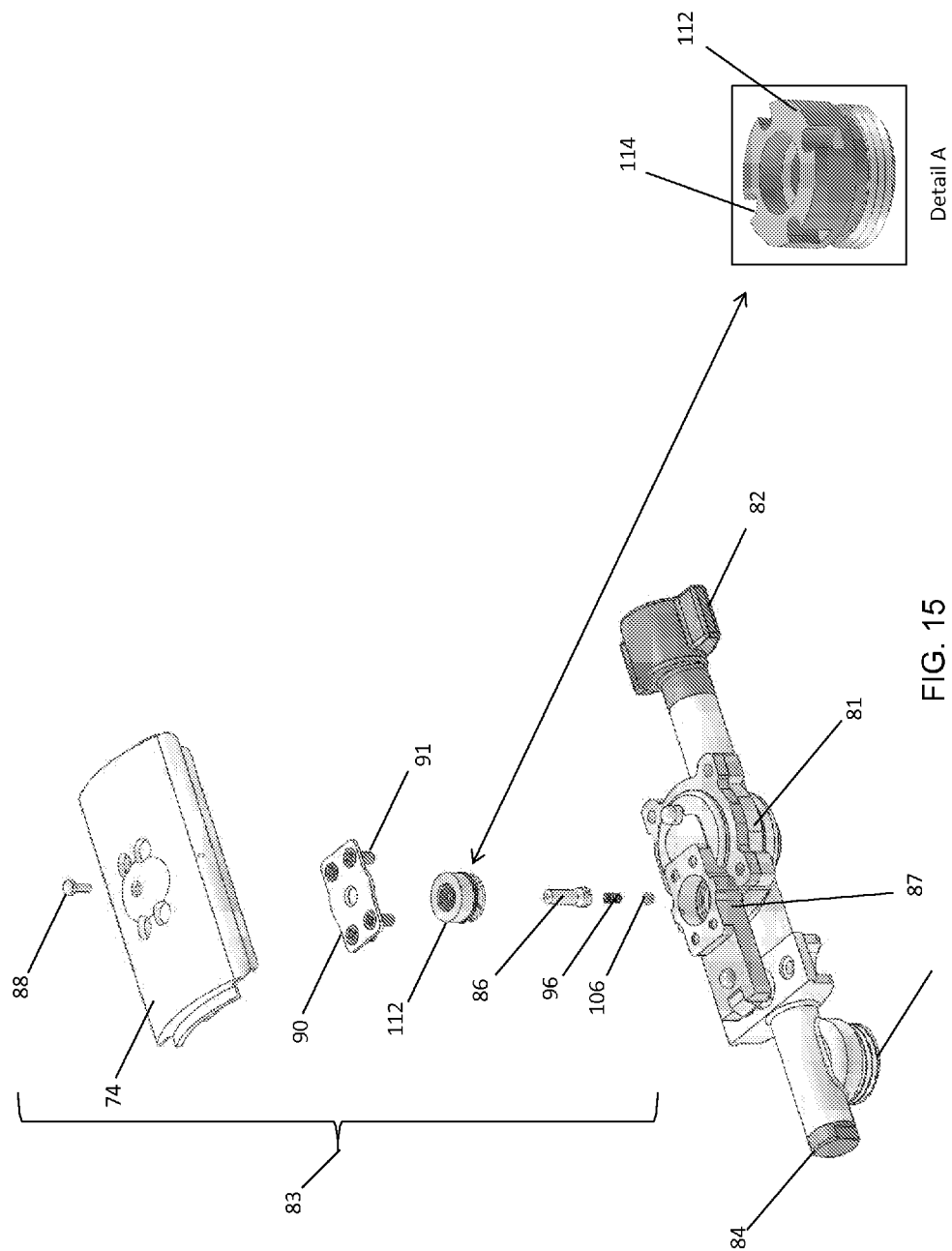
FIG. 15 is an exploded view of the rocker valve switch mechanism according to an embodiment of the invention.

FIG. 15 is an exploded view of the rocker valve switch mechanism 83. In the specific embodiment shown, the rocker valve switch mechanism 83 has a rocker valve switch touch surface 74 that is attached to the ball cage 86 with a fastener 88. A plate 90 retains the ball cage cap 112, ball cage 86, spring 96, and ball 106 within the valve cap 87. The plate 90 is joined to the valve cap 87 with fasteners 91, such as M-4 bolts and nuts. As shown in Detail A, the ball cage cap 112 has top grooves 114 for a grip tool.

Figure 16:
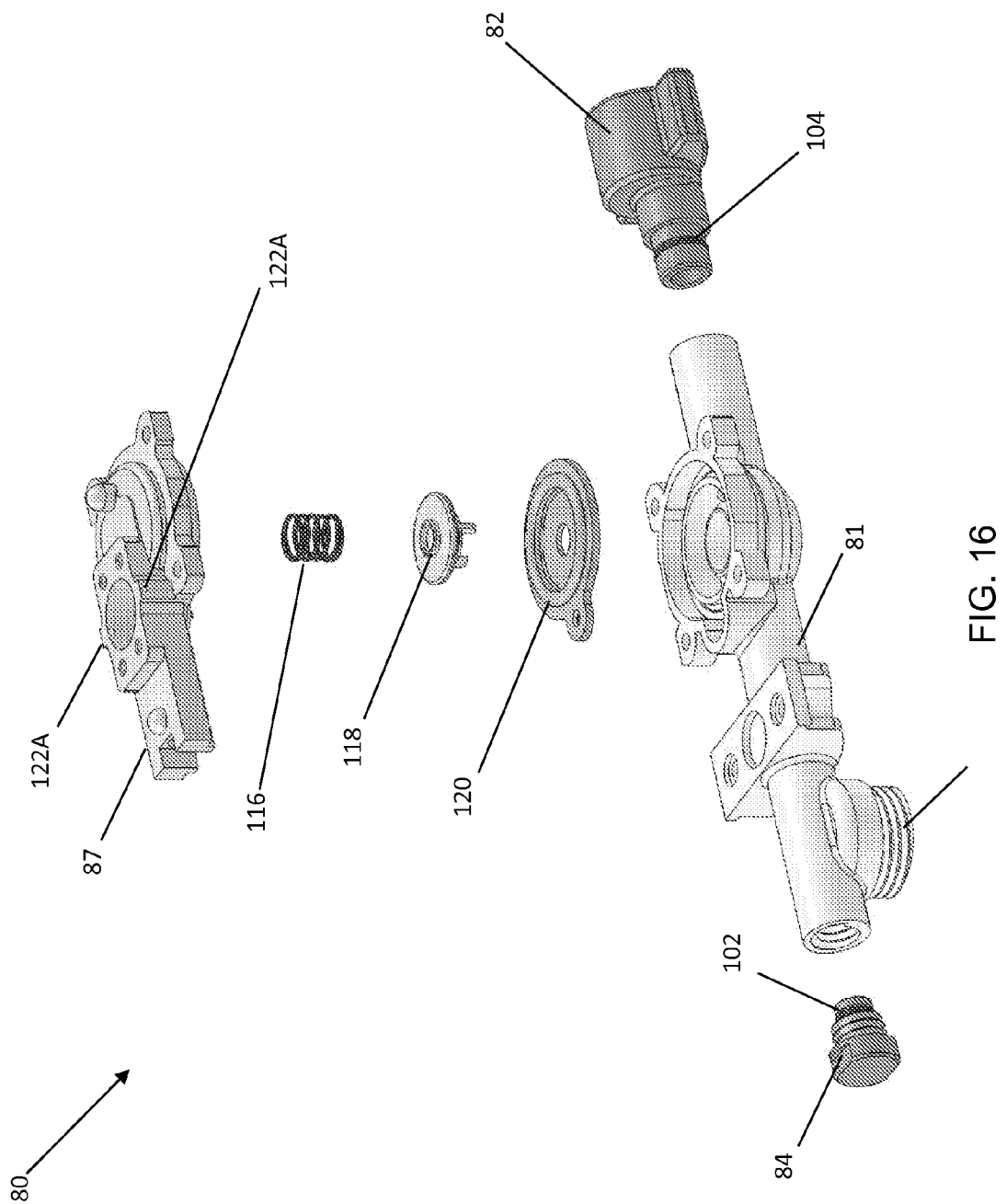
FIG. 16 is an exploded view of valve mechanism hydraulic assembly according to an embodiment of the invention.

FIG. 16 is an exploded view of valve mechanism hydraulic assembly 80 according to an embodiment of the invention. In the specific embodiment shown, the valve mechanism hydraulic assembly 80 has the valve cap 87 which retains a valve spring 116, membrane core 118, and membrane 120 in a cavity of the valve base 81. The valve cap 87 may be secured to the valve base 81 with fasteners, such as M-4 bolts and nuts.

Figure 17:
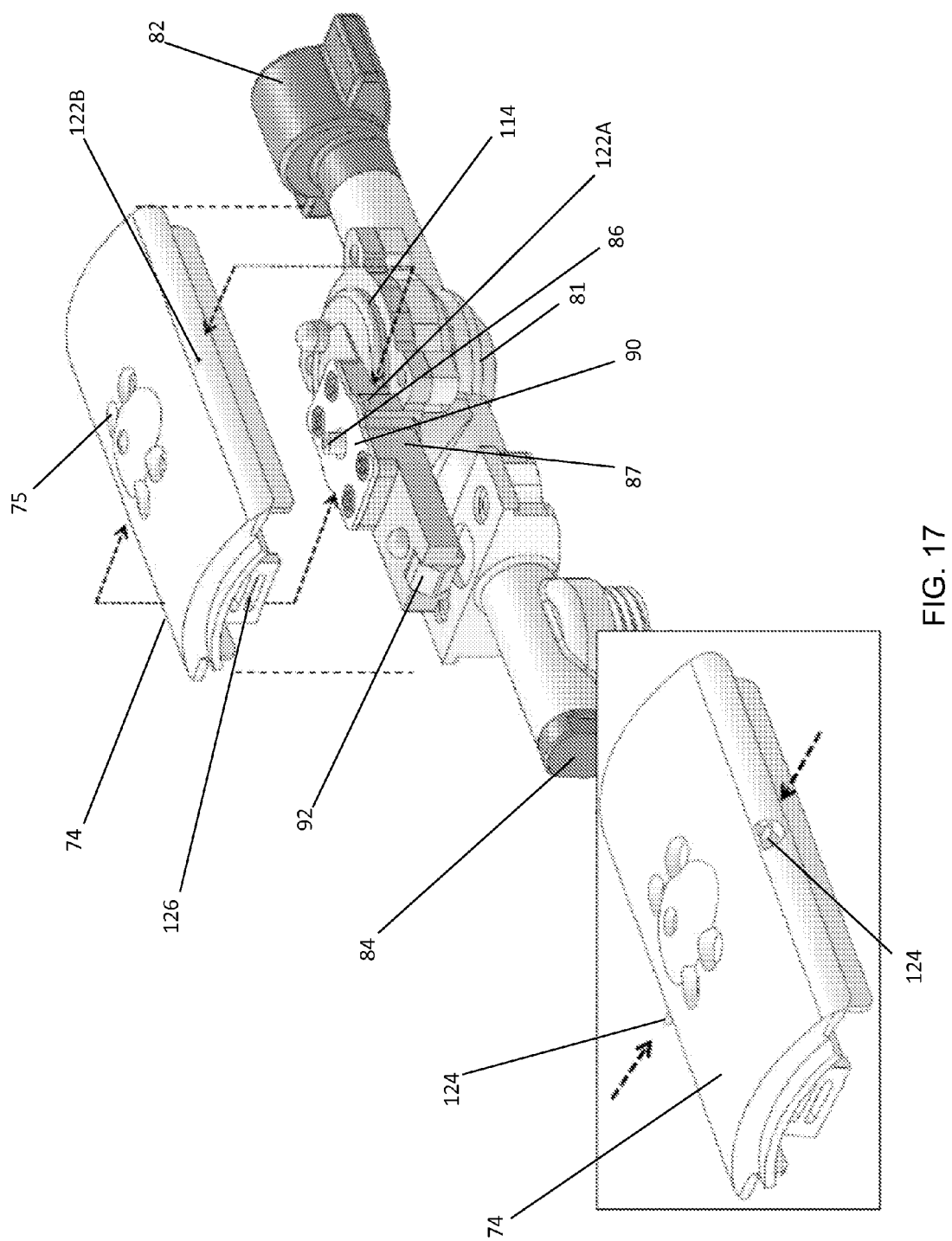
FIG. 17 is a perspective view of the rocker valve switch separated from the valve mechanism with a detail view of the rocker valve switch showing the pivot pins according to an embodiment of the invention.

FIG. 17 is a perspective view of the rocker valve switch touch surface 74 separated from the rocker valve switch mechanism 83 with a detail view of the of the rocker valve switch touch surface 74 showing the pivot pins 124 that are inserted into pivot holes 122A of the valve cap 87 and pivot holes 122B of the rocker valve switch touch surface 74, and facilitate the up and down rocking motion of the rocker valve switch touch surface 74.

FIGS. 18A and 18B show a cross-sectioned view of a closed valve and the notching mechanism 92 with the non-depressed rocker switch 74, respectively. With the rocker switch 72 in an up or non-depressed position, the ball 106 rests in the O-ring 107 and closes off the channel 109 and stops fluid flow to the threaded spout 100 or aerator 76. In the closed position notching mechanism 92 engages the lower slot 126L.

FIGS. 18C and 18D show a cross-sectioned view of an open valve and the notching mechanism 92 with the depressed rocker switch 74, respectively. With the rocker switch in a down or depressed position (shown by arrow), the ball 106 moves to the side of the O-ring 107 and opens the channel 109 and fluid flow to the threaded spout 100 or aerator 76. In the open position notching mechanism 92 engages the upper slot 126U.

The foregoing description is illustrative of particular embodiments of the invention, but is not meant to be a limitation upon the practice thereof. The following claims, including all equivalents thereof, are intended to define the scope of the invention.

The invention claimed is:

1. A touch faucet device for coupling to a pressurized fluid supply comprising:
    a faucet with touch plate and an outlet; and
    a mechanical membrane valve having a first position and a second position, said mechanical membrane valve blocking fluid flow from the pressurized fluid supply in the first position and allowing fluid flow from the pressurized fluid supply through the outlet in the second position, said mechanical membrane valve being urged into the first position by a spring; and
    an activator mechanism comprising a ball cage attached to said touch plate, said ball cage controlling the position of a ball between an open position and a closed position, where in the closed position the ball blocks a channel positioned downstream of said mechanical membrane valve and the flow of said fluid through said device, and where in the open position the ball moves away from the channel and said fluid flows through said channel, said actuator mechanism actuated by depression of said touch plate by a user to selectively open and close the channel positioned downstream of said mechanical membrane valve;
    wherein movement of said mechanical membrane valve from the first position to the second position is controlled by actuation of said activator mechanism to open the channel thereby allowing the mechanical membrane valve to compress the spring.

2. The device of claim 1 wherein said faucet further comprises a mixing valve for control of fluid temperature and flow rate.

3. The device of claim 1 wherein the fluid flow from the pressurized fluid supply further comprises at least one of water, carbonated beverages, alcoholic drinks, medicaments, juices, organic liquids, and other compositions.

4. The device of claim 1 wherein the touch plate is positioned on a neck region of the faucet.

5. The device of claim 1 wherein the device has an outer surface that is made of chrome plated materials, stainless steel, metals, plastics, composite materials, and combinations thereof.

6. The device of claim 1 wherein said touch plate is positioned on an upper surface of the device.

7. The device of claim 1 wherein said touch plate is a rocker switch that actuates movement of said activator mechanism by pivotal depression.

8. The device of claim 1 wherein said touch plate is a touch surface segment that actuates movement of said activator mechanism by linear depression.

9. The device of claim 1 wherein said touch plate further comprises an activation knob in an activator mechanism that is actuated by pressure applied by said touch plate, said activator mechanism in in mechanical communication with said membrane valve, said activator mechanism controlling said membrane valve.

10. The device of claim 9 wherein said activator mechanism further comprises a cam shaft having a proximal end to said activation knob with a set of gear teeth and a distal end with a cam that controls the upward or downward motion of a needle valve for opening or closing a fluid orifice.

11. The device of 10 wherein said activation knob further comprises a flexing actuating arm in mechanical communication with said gear teeth that advances said cam in ninety degree increments for every depression by the user of said touch plate.

12. The device of claim 1 wherein said touch plate is flush with an outer surface of said device.

* * * * *